(12) United States Patent
Jacques

(10) Patent No.: US 10,710,673 B2
(45) Date of Patent: Jul. 14, 2020

(54) CRANKSET AND METHOD FOR TRANSFERING POWER IN A CRANKSET

(71) Applicant: PROTO FAB INC., St-Hubert (CA)

(72) Inventor: Luc Jacques, St-Hubert (CA)

(73) Assignee: PROTO FAB INC., Saint-Hubert, Quebec (CA)

( * ) Notice: Subject to any disclaimer, the term of this patent is extended or adjusted under 35 U.S.C. 154(b) by 824 days.

(21) Appl. No.: 14/652,718

(22) PCT Filed: Dec. 20, 2013

(86) PCT No.: PCT/CA2013/051001
§ 371 (c)(1),
(2) Date: Jun. 16, 2015

(87) PCT Pub. No.: WO2014/094174
PCT Pub. Date: Jun. 26, 2014

(65) Prior Publication Data
US 2015/0329171 A1 Nov. 19, 2015

Related U.S. Application Data

(60) Provisional application No. 61/740,871, filed on Dec. 21, 2012.

(51) Int. Cl.
*B62M 3/08* (2006.01)
*B62M 11/02* (2006.01)
(Continued)

(52) U.S. Cl.
CPC ............... *B62M 3/08* (2013.01); *B62M 3/00* (2013.01); *B62M 9/02* (2013.01); *B62M 11/02* (2013.01); *B62M 11/06* (2013.01); *Y10T 74/2168* (2015.01)

(58) Field of Classification Search
CPC .......... B62M 3/08; B62M 3/00; B62M 11/02; B62M 9/02
See application file for complete search history.

(56) References Cited

U.S. PATENT DOCUMENTS 4,173,154 A 11/1979 Sawmiller et al.
4,882,945 A 11/1989 Trevizo
(Continued)

FOREIGN PATENT DOCUMENTS

CA 2 352 977 A1 5/2000
DE 867060 C 2/1953
(Continued)

OTHER PUBLICATIONS

Jacques, Andre. Machine translation of CA2352977. Espacenet. (Year: 2000).*

(Continued)

*Primary Examiner* — Jacob S. Scott
*Assistant Examiner* — Lori Wu
(74) *Attorney, Agent, or Firm* — Merchant & Gould P.C.

(57) ABSTRACT

A crankset for a pedal-driven vehicle has a frame with a bottom bracket shell. The crankset includes a crank arm rotatably mounted to the bottom bracket shell of the frame; a spindle operatively connected to the crank arm at an end spaced-apart from the bottom bracket shell and rotatable about a spindle rotation axis. A stationary member fixedly mounts to the bottom bracket shell. A rotatable member operatively engages the spindle and is configured to engage the spindle in rotation. A connecting assembly operatively engages the stationary member and the rotatable member. The connecting assembly is configured to engage the rotatable member in rotation upon rotation of the crank arm about the bottom bracket shell. A pedal angular control assembly operatively connects to the spindle and is configured to (Continued)

control an angle of a pedal according to an angular position of the crank arm during rotation.

19 Claims, 14 Drawing Sheets

(51) Int. Cl.
*B62M 9/02* (2006.01)
*B62M 3/00* (2006.01)
*B62M 11/06* (2006.01)

(56) References Cited

U.S. PATENT DOCUMENTS

| | | |
|---|---|---|
| 5,257,562 A | 11/1993 | Nagano |
| 5,419,572 A | 5/1995 | Stiller et al. |
| 6,050,154 A | 4/2000 | Fan |
| 6,796,200 B2 | 9/2004 | Kelly |
| 6,830,259 B2 * | 12/2004 | Jakovljevic .............. B62M 1/36 280/259 |
| 7,520,196 B2 * | 4/2009 | Stallard .................... B62M 3/04 74/594.1 |
| 8,146,938 B2 | 4/2012 | Gobillard |
| 2006/0066073 A1 | 3/2006 | Schuft |

FOREIGN PATENT DOCUMENTS

| | | |
|---|---|---|
| FR | 2 259 739 A1 | 8/1975 |
| FR | 2663898 A1 | 1/1992 |
| GB | 1563303 A | 3/1980 |
| JP | 2005247248 B1 | 9/2005 |
| WO | 9207752 A1 | 5/1992 |
| WO | 2011115524 A1 | 9/2001 |
| WO | 2004092003 A1 | 10/2004 |
| WO | 2005073067 A1 | 8/2005 |
| WO | 2009028933 A1 | 3/2009 |

OTHER PUBLICATIONS

European Examination Report for corresponding European Patent Application No. 13864762.3 dated Jul. 9, 2018, 8 pages.

* cited by examiner

CRANKSET AND METHOD FOR TRANSFERING POWER IN A CRANKSET

CROSS REFERENCE TO RELATED APPLICATION

This application is a National Stage Application of PCT/CA2013/051001, filed Dec. 20, 2013, which claims the benefit under 35 U.S.C. § 119(e) of U.S. provisional patent application No. 61/740,871 which was filed on Dec. 21, 2012, and which applications are incorporated herein by reference. To the extent appropriate, a claim of priority is made to each of the above disclosed applications.

FIELD OF THE INVENTION

The present invention relates to the field of cranksets. More particularly, it relates to an improved crankset for enhancing the power generated when pedaling and a method for transferring power using same.

BACKGROUND

In traditional cranksets, a pedal is rotatively mounted to a crank arm by a spindle and can rotate freely on the spindle during the rotation of the crank arm caused by the pedaling movement of a cyclist. This free rotation of the pedal on the spindle results in the angle of the pedal being solely controlled by the positioning of the feet of the cyclist during the pedaling movement.

In most cases, when using these traditional cranksets, the angular positioning of the pedal during the rotation of the crank arm does not provide optimal thrust force, which consequently leads to loss of pedaling power.

For example, tests have shown that, when using traditional cranksets, the thrust force is effectively applied only between approximately 30 degrees and 130 degrees from an upward vertical position of the crank arm. Therefore, approximately 80 degrees of thrust force are lost during the downward push of the crank arm, between the upward vertical position and the downward vertical position, as a result of the pedal not being angled appropriately.

In order to address this issue, electronic devices are currently available for indicating the optimal positioning of the feet during the pedaling motion. However, these devices tend to be expensive and constrain the cyclist to permanently concentrate on the position of its feet, which can be tiring.

In view of the above, there is a need for an improved crankset and method for transferring power using same, which would be able to overcome or at least minimize some of the above-discussed prior art concerns.

SUMMARY OF THE INVENTION

According to a first general aspect, there is provided a crankset for a pedal-driven vehicle having a frame with a bottom bracket shell. The crankset comprises a crank arm rotatably mounted to the bottom bracket shell of the frame; a spindle operatively connected to the crank arm at an end spaced-apart from the bottom bracket shell and rotatable about a spindle rotation axis; a stationary member fixedly mounted to the bottom bracket shell; a rotatable member operatively engaged with the spindle and configured to engage the spindle in rotation; a connecting assembly operatively engaged with the stationary member and the rotatable member, the connecting assembly being configured to engage the rotatable member in rotation upon rotation of the crank arm about the bottom bracket shell; and a pedal angular control assembly operatively connected to the spindle and being configured to control an angle of a pedal according to an angular position of the crank arm during the rotation thereof.

According to another general aspect, there is also provided a crankset for a pedal-driven vehicle having a frame. The crankset comprises two crank arm assemblies. Each one of the crank arm assemblies comprises: a crank arm rotatably mounted to the frame and having a rotation center at a rotation end thereof; a spindle operatively connected to the crank arm at a spindle end spaced-apart from the rotation end and rotatable about a spindle rotation axis; a pedal mounted to the spindle; a rotatable member operatively engaged with the spindle; a stationary member secured to the frame and close to the rotation end of the crank arm; a connecting assembly operatively engaged with the stationary member and the rotatable member and configured to engage the rotatable member in rotation upon rotation of the crank arm about the rotation center thereof; and a pedal angular control assembly operatively connected to the rotatable member and configured to control an angle of the pedal according to an angular position of the crank arm during rotation thereof about the rotation center.

In an embodiment, the spindle is rotatably mounted to the crank arm at an end spaced-apart from the bottom bracket shell.

In an embodiment, the stationary member comprises a stationary gear concentric with the bottom bracket shell.

In an embodiment, the rotatable member comprises a rotatable gear.

In an embodiment, the connecting assembly comprises a plurality of intermediate rotatable gears extending between the stationary gear and the rotatable gear and each one being operatively connected with an adjacent one of the rotatable gear, stationary gear and intermediate gears.

In an embodiment, each one of the stationary gear, the rotatable gear and the intermediate gears comprise a same number of teeth.

In an embodiment, the rotatable member comprises a rotatable pulley and the connecting assembly comprises: a connecting rotatable gear meshing with the stationary gear and configured to rotate about the stationary gear; an engaging pulley mounted to the connecting rotatable gear and rotating simultaneously therewith; and a belt operatively connecting the engaging pulley and the rotatable pulley.

In an embodiment, the connecting assembly comprises: a connecting rotatable gear meshing with the stationary gear and configured to rotate about the stationary gear; and a transfer arm having a rotation end operatively connected to the connecting rotatable gear at a proximal connection point spaced-apart from a rotation center thereof and a spindle end, opposed to the rotation end, operatively connected to the rotatable member at a distal connection point spaced-apart from a rotation center thereof.

In an embodiment, the proximal connection point and the distal connection point are positioned at opposed angular position with respect to the connecting rotatable gear and the rotatable member respectively.

In an embodiment, the pedal angular control assembly comprises at least one cam operatively connected to the rotatable member and operatively engaged with the pedal and a cam connecting assembly configured to engage in rotation the at least one cam upon rotation of the rotatable member.

In an embodiment, the pedal angular control assembly further comprises an abutting assembly operatively connected to the pedal and abutting the at least one cam to vary the angle of the pedal according to the angular position of the crank arm during rotation thereof.

In an embodiment, the cam connecting assembly comprises: a stationary gear; a cam support plate operatively connected to the spindle and configured to rotate therewith; and at least one cam gear rotatably mounted to the cam support plate and configured to rotate about the stationary gear upon rotation of the cam support plate, each one of the at least one cam being coupled to a respective one of the at least one cam gear.

In an embodiment, the cam support plate is mounted to the spindle.

In an embodiment, the abutting assembly comprises at least one abutting cam member rotatably mounted to the pedal, each one of the at least one abutting cam member abutting with a corresponding one of the at least one cam.

In an embodiment, the cam connecting assembly comprises: a stationary gear; and at least one cam gear operatively engaged with the stationary gear and configured to rotate about the stationary gear, each one of the at least one cam being coupled to a respective one of the at least one cam gear. The abutting assembly comprises a cam receiving plate mounted to the pedal and having at least one cam receiving cavity defined therein, the at least one cam being movable inside the at least one cam receiving cavity to vary the angle of the pedal according to the angular position of the crank arm during rotation thereof.

In an embodiment, each one of the at least one cam is movable inside a respective one of the at least one cam receiving cavity.

In an embodiment, the at least one cam comprises two cams, each one of the two cams being mounted to a respective side of the spindle.

In an embodiment, the pedal angular control assembly comprises at least one angular control arm operatively connected to the spindle through an arm connecting assembly configured to move the at least one angular control arm upon rotation of the spindle, the at least one angular control arm also being operatively connected to the pedal.

In an embodiment, the arm connecting assembly comprises: a stationary gear; a support plate mounted to the spindle and configured to rotate therewith; at least one eccentric connector gear rotatably mounted to the support plate and configured to rotate about the stationary gear upon rotation of the support plate; and an eccentric connector being coupled to each one of the at least one eccentric connector gear, the eccentric connector being connected to a corresponding one of the at least one angular control arm at a connection point spaced apart from a rotation center thereof.

In an embodiment, the pedal is configured to receive the spindle in a lower section thereof, spaced apart from a center of gravity of the pedal.

In an embodiment, the pedal comprises a foot receiving face and a lower face, opposed to the foot receiving face, and the spindle extends through the pedal, close to the lower face.

In an embodiment, the stationary member, the rotatable member and the connecting assembly are at least partially housed in the crank arm.

According to another general aspect, there is also provided, a method for transferring power in a crankset of a pedal-driven vehicle. The crankset comprises a crank arm having a rotation end rotatably mounted to a bottom bracket shell of the pedal-driven vehicle, a spindle operatively connected to a spindle end of the crank arm and a pedal operatively connected to the spindle and having a foot receiving face. The method comprises the steps of: applying forces to the pedal to engage in rotation the crank arm about its rotation axis; and controlling an angle of the foot receiving face in accordance with an angular position of the crank arm during rotation thereof.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which:

FIGS. 2A and 2B show the mechanism of one crank arm assembly without a cover and a crank arm; and FIG. 2C shows the mechanism of the crank arm assembly without the cover and the crank arm and without a pedal.

FIGS. 5A to 5C are side elevation views of the pedal angular control shown in FIGS. 2A to 2C, wherein FIG. 5A shows the angular control assembly with the pedal; FIG. 5B shows the angular control assembly without the pedal; and FIG. 5C shows the angular control assembly without the pedal, the cams, and the abutting cam members.

FIGS. 7B to 7D are outer side elevation views of the pedal angular control assembly according to the embodiment of FIG. 7A, wherein FIG. 7B shows the angular control assembly with the pedal; FIG. 7C shows the angular control assembly without the pedal; and FIG. 7D shows the angular control assembly without the pedal, the cams, and the abutting cam members.

FIGS. 9A to 9C are side elevation views of a pedal angular control assembly according to an embodiment where the pedal angular control assembly includes an angular control arm, wherein FIG. 9A shows the angular control assembly with the pedal; FIG. 9B shows the angular control assembly without the pedal; and FIG. 9C shows the angular control assembly without the pedal and the angular control arm.

FIGS. 11A, 11B, and 11C are side elevation views of a pedal angular control assembly according to an embodiment where the pedal angular control assembly includes a cam and a cam receiving plate, wherein FIG. 11A shows the angular control assembly with a pedal; FIG. 11B shows the angular control assembly without the pedal; and FIG. 11C shows the angular control assembly without the pedal, the cam and the cam receiving plate.

DETAILED DESCRIPTION

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the crankset and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the crankset, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

Figure 1:
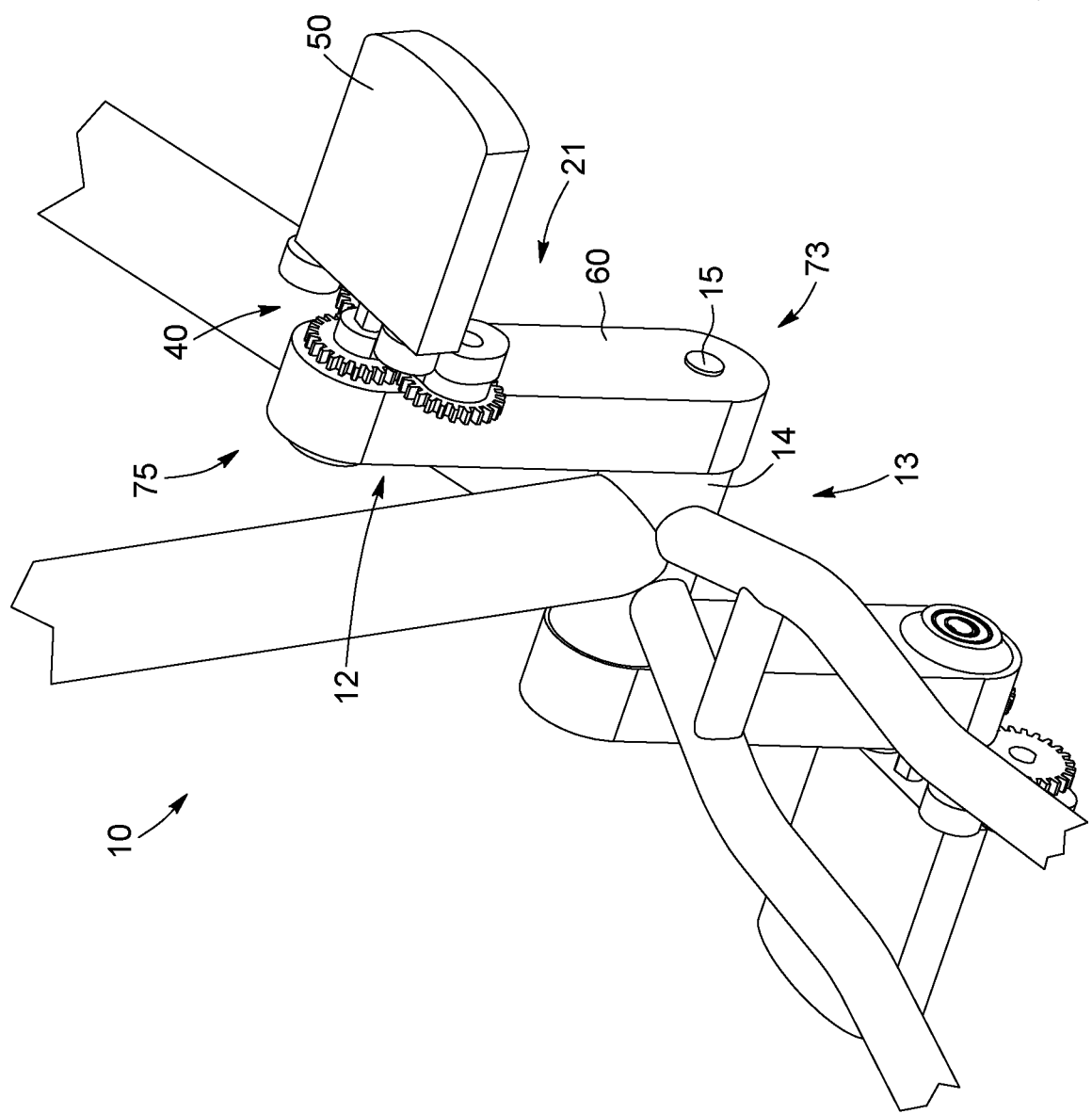
FIG. 1 is a perspective view of a crankset according to an embodiment and mounted to a frame of a pedal driven vehicle.

Referring generally to FIG. 1, in accordance with one embodiment, there is provided a crankset 10 for a pedal-driven vehicle such as, for example and without being limitative, a bicycle. As will be described in more details below, the crankset 10 is configured to transfer the rotary motion of a crank arm 12 to an angular control assembly 40 in order to control the angle of a pedal 50 according to an angular position of the crank arm 12, thereby enhancing the power generated by a cyclist when pedaling.

In an embodiment, the crankset 10 comprises two crank arm assemblies 21, as shown in FIG. 1. However, to simplify the description, only one of the crank arm assemblies 21 will be described in further details below.

Figure 2A:
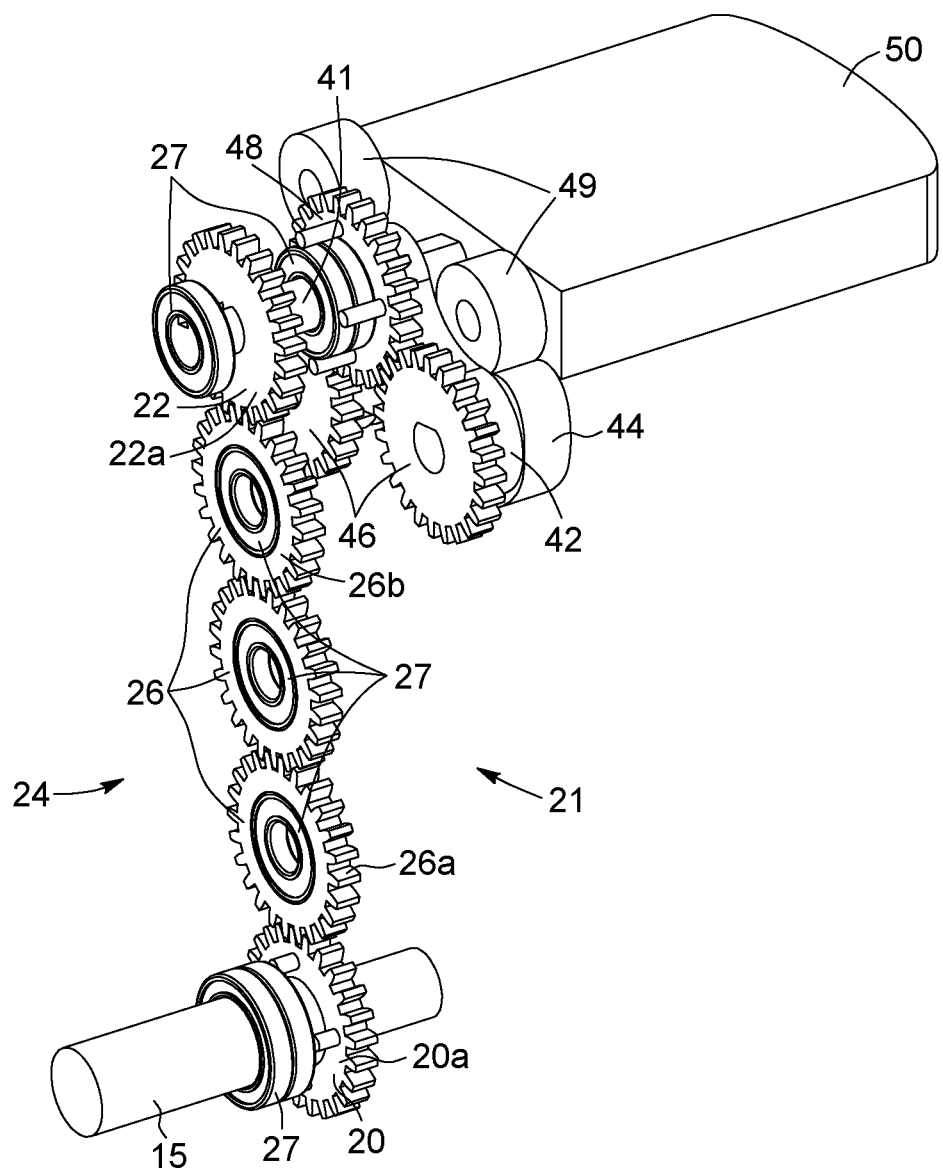
FIGS. 2A to 2C are perspective views of a crankset according to an embodiment wherein a connecting assembly includes intermediate gears and the pedal angular control assembly includes cams and abutting cam members, where
Figure 2B:
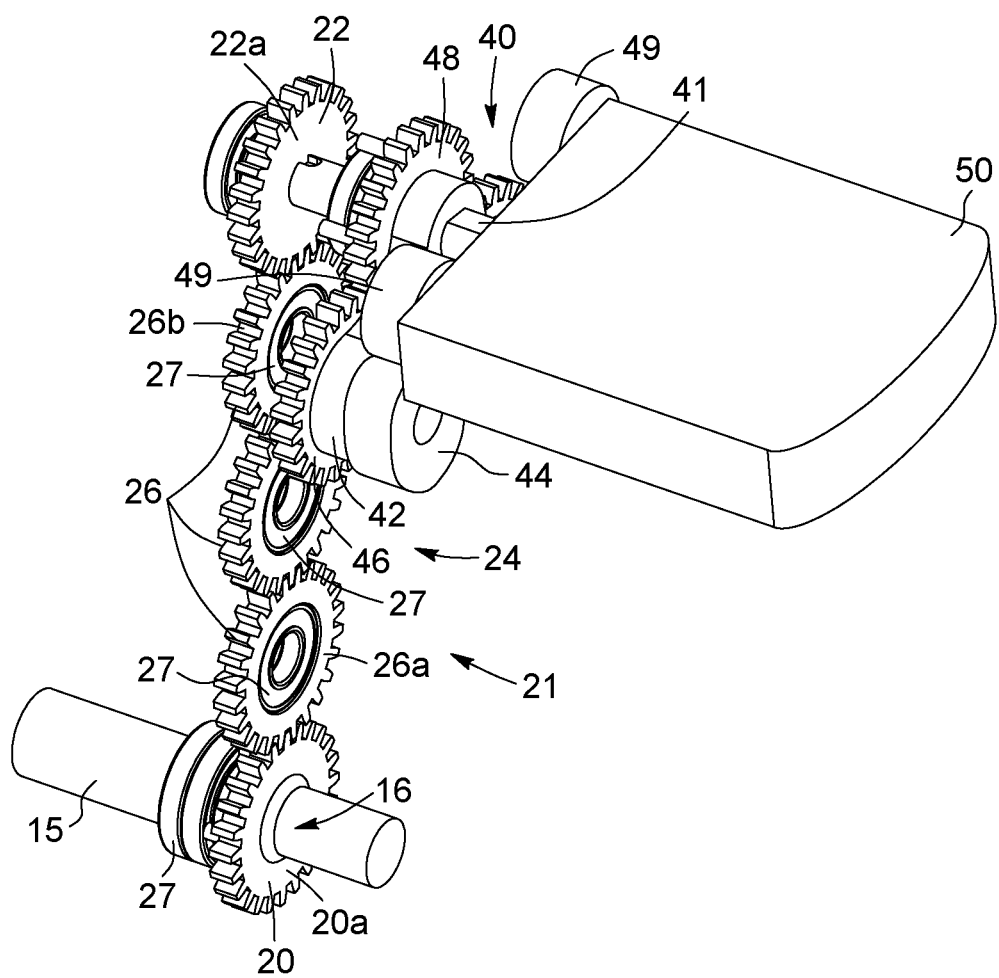
Figure 2C:
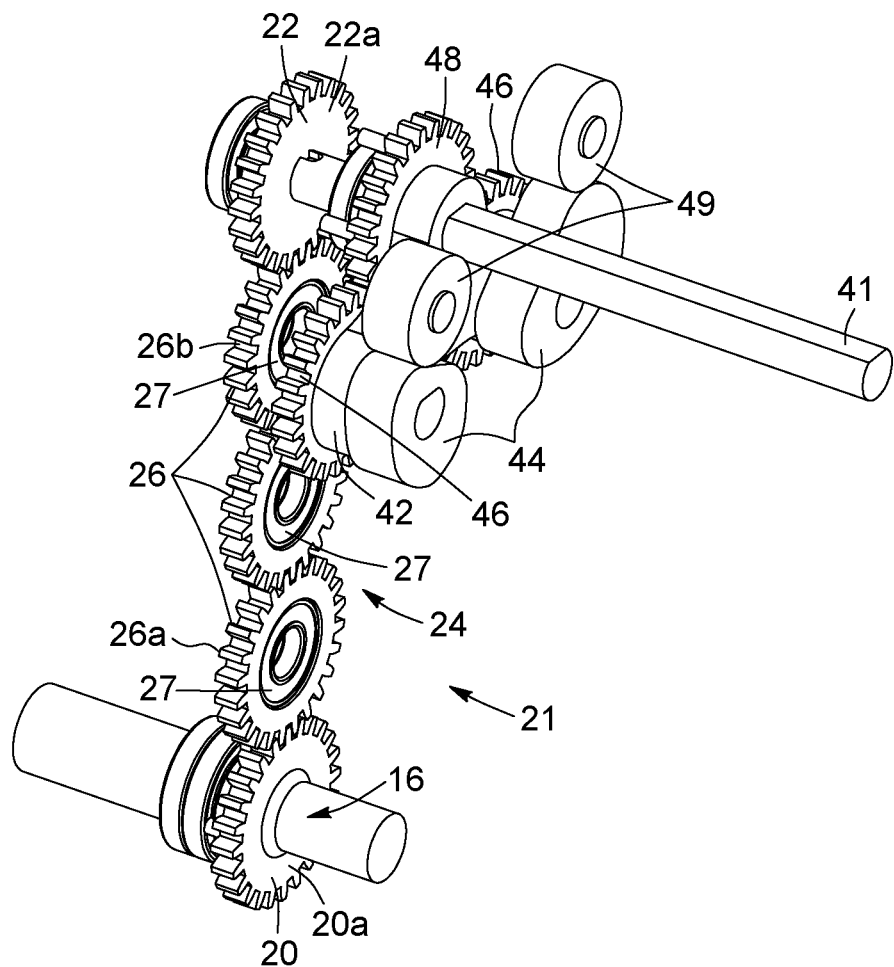

Now referring to FIGS. 1 to 2C, in one embodiment, in addition to the crank arm 12 and the pedal 50, the crank arm assembly 21 includes a stationary member 20 which is fixedly mounted to the frame 13 of the pedal-driven vehicle and therefore cannot rotate about a rotation axis. In the illustrated embodiment, the stationary member 20 is a stationary gear 20a with peripheral tooth. The stationary gear 20a is located proximate to the bottom bracket shell 14 of the frame 13 at a rotation end 73 of the crank arm 12, as will be described in more details below. In the embodiment shown, the stationary member 20 is concentric with the bottom bracket shell 14. The rotation end 73 of the crank arm 12 rotates about a rotation center of the crank arm. In an embodiment, the stationary gear 20a is located at the periphery of the bottom bracket shell 14 such that the spindle 15 of the bottom bracket, through which the crank arm 12 is connected to the frame 13, goes through a bore 16 of the stationary gear 20a. It should be understood that the stationary gear 20a is distinct from the chainrings (not shown) mounted to the crank arm 12.

The stationary gear 20a may be removably or permanently mounted to the frame 13 using various mounting techniques, such as, without being limitative, screwing, welding, soldering or the like.

Still referring to FIGS. 1 to 2C, the crank arm assembly 21 is further provided with a rotatable member 22 engaged to a spindle 41 close to a spindle end 75 of the crank arm 12, distal from the rotation end 73 located proximate to the bottom bracket shell 14 and the corresponding stationary gear 20a. In the embodiment shown, the spindle 41 is mounted to the spindle end 75 of the crank arm 12. In the illustrated embodiment, the rotatable member 22 is a rotatable gear 22a. Given that the spindle 41 is rotatably mounted to the crank arm 12, the rotatable gear 22a can rotate relative to the crank arm 12, about a rotation axis defined by the spindle 41. In the illustrated embodiment, the spindle 41 is rotatably mounted to the crank arm 12 through rolling assemblies 27, such as, without being limitative, bearing assemblies.

The crank arm assembly 21 further comprises a connecting assembly 24. The stationary gear 20a and the rotatable gear 22a are operatively connected to one another through the connecting assembly 24 such that the rotation of the crank arm 12 about the rotation center thereof, the bottom bracket shell 14, and the stationary gear 20a, causes the rotation of the rotatable gear 22a.

In the embodiment shown in FIGS. 2A to 2C, the connecting mechanism 24 includes a plurality of aligned intermediate gears 26 located between the stationary gear 20a and the rotatable gear 22a. The intermediate gears 26 mesh with adjacent ones of the intermediate gears 26, the stationary gear 20a, and the rotatable gear 22a and are rotatably mounted to the crank arm 12 through respective rolling assemblies 27, such as, without being limitative, bearing assemblies. In the illustrated embodiment, a first one 26a of the intermediate gears 26 directly meshes with the stationary gear 20a and a second one 26b of the intermediate gears 26 meshes with the rotatable gear 22a.

One skilled in the art will understand that, in an alternative embodiment (not shown), where the first one of the intermediate gears 26a and the stationary gear 20a are not aligned vertically, meshing between the first one of the intermediate gears 26a and the stationary gear 20a may require the first one of the intermediate gears 26a or the stationary gear 20a to be operatively connected to an extension gear horizontally in line and secured to it, the extension gear being vertically aligned with the other one of the first one of the intermediate gears 26a or the stationary gear 20a. Similarly, an extension gear may be used to mesh any of the intermediate gear, if successive intermediate gears are not aligned vertically, or to mesh the second one of the intermediate gears and the rotatable gear 22a in an embodiment where the second one of the intermediate gear 26b is not aligned vertically with the rotatable gear 22a.

In an embodiment, the stationary gear 20a, the intermediate gears 26 and the rotatable gear 22a present the same number of teeth in order to ensure that the timing between the rotatable gear 22a and the angular position of the crank arm 12 is maintained over multiple rotations of the crank arm 12.

One skilled in the art will understand that, in alternative embodiments, other connecting assemblies may be provided between the stationary member 20 and the rotatable member 22. Indeed, any connecting assembly 24 or mechanism which operatively connects the stationary member 20 and the rotatable member 22 and results in the rotatable member 22 being engaged in rotation by the rotation of the crank arm 12 about the bottom bracket shell 14 and the stationary member 20 could be used. In an embodiment, the connecting assembly 24 is designed such that minimal power is lost by the friction of the components of the connecting assembly 24 with the stationary member 20 and the rotatable member 22 during rotation of the crank arm 12.

Figure 3:
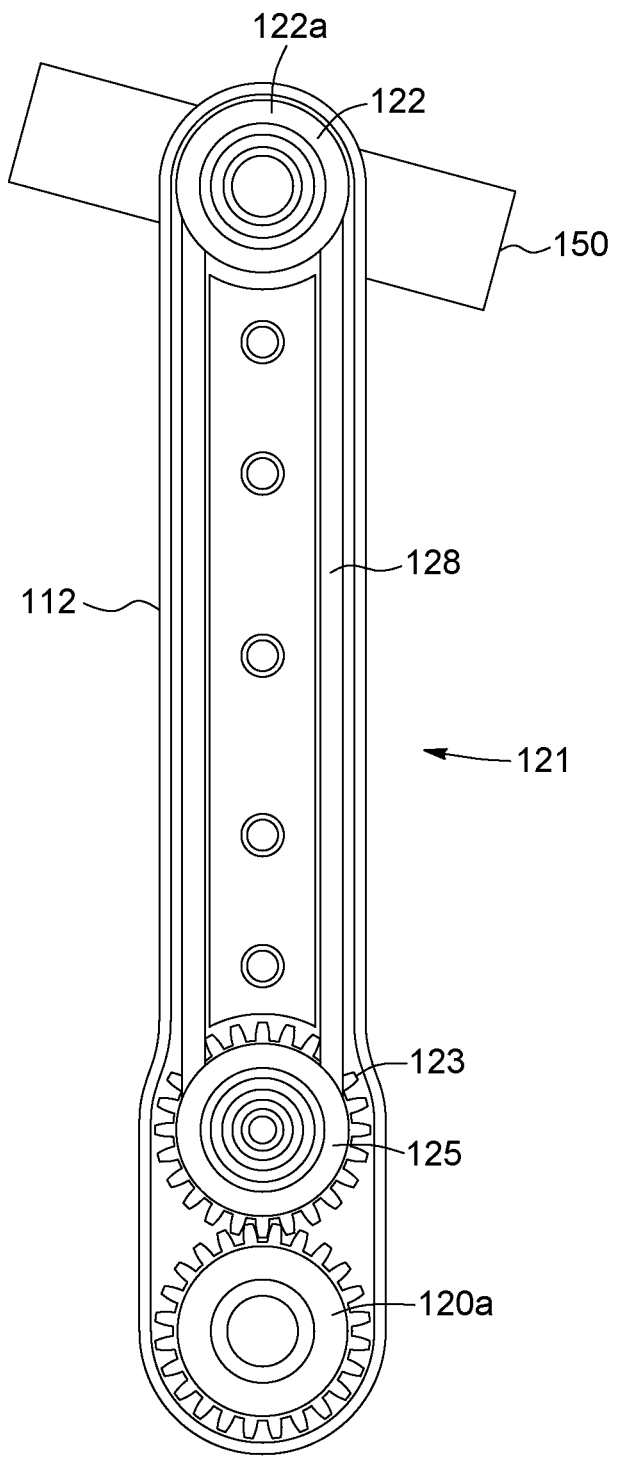
FIG. 3 is a side elevation view of a crank arm assembly of the crankset, according to an embodiment where the connecting assembly includes a belt.

For example and without being limitative, as can be seen in FIG. 3 where like features are numbered with corresponding reference numbers in the 100 series, in an alternative embodiment where the rotatable member 122 comprises a rotatable pulley 122a, the stationary gear 120a and the rotatable pulley 122a may be operatively connected through a combination of a connecting rotational gear 123, an engaging pulley 125, and a belt 128. In the illustrated embodiment, the stationary gear 120a meshes with the connecting rotational gear 123 having the engaging pulley 125 fixedly mounted thereto, such that the engaging pulley 125 is engaged in rotation by the connecting rotational gear 123. The engaging pulley 125 is operatively connected to the rotatable pulley 122a by the belt 128 which surrounds both the engaging pulley 125 and the rotatable pulley 122a. One skilled in the art will understand that, in an alternative embodiment, a similar assembly where the pulleys are replaced by sprockets and the belt is replaced by a roller chain could also be used.

Figure 4:
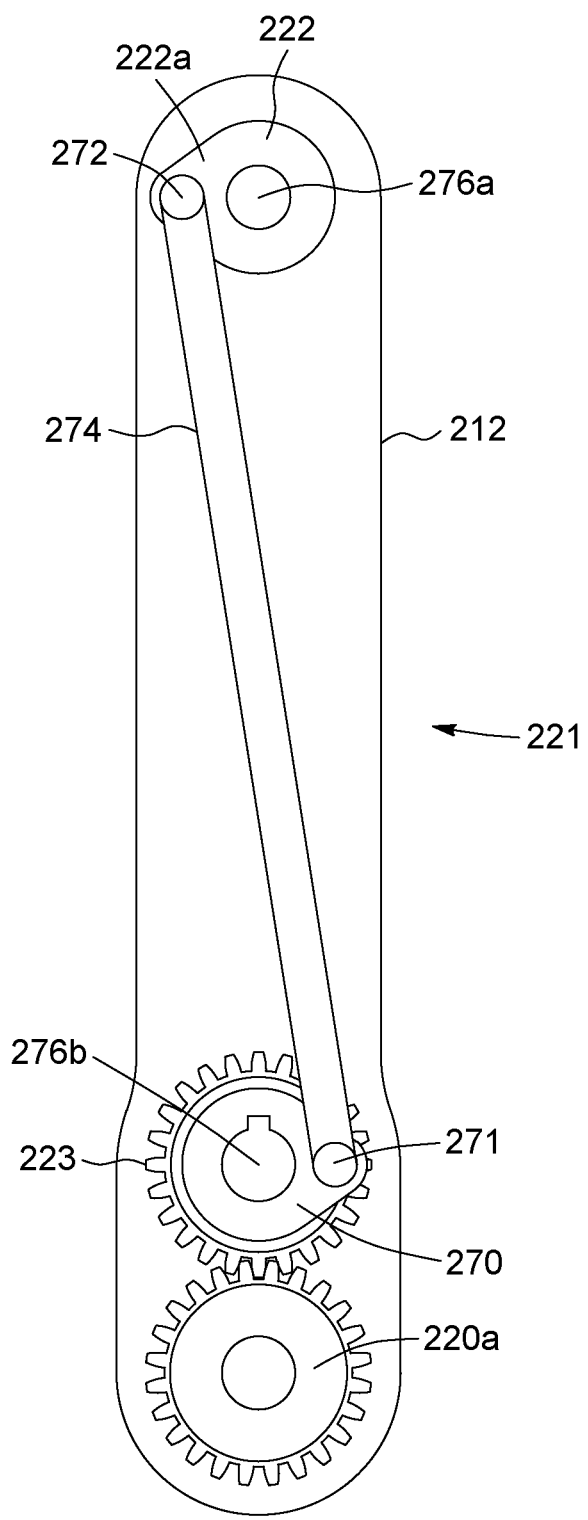
FIG. 4 is a side elevation view of a crank arm assembly of the crankset, according to an embodiment where the connecting assembly includes a transfer arm.

In another alternative embodiment shown in FIG. 4, where like features are numbered with corresponding reference numbers in the 200 series, the rotatable member 222 comprises a rotatable cam-shaped extension 222a with a distal connection point 272 spaced apart from a rotation center 276a. The stationary gear 220a and the rotatable cam-shaped extension 222a are operatively connected through a combination of a connecting rotational gear 223, an engaging cam-shaped extension 270, and a transfer arm 274 (or connecting stick). As in the above-described embodiment, the stationary gear 220a meshes with the connecting rotational gear 223. The engaging cam-shaped extension 270 is securely mounted to the connecting rotational gear 223 and rotates therewith. Thus, the engaging cam-shaped extension 270 is directly engaged in rotation by the connecting rotational gear 223. The engaging cam-shaped extension 270 is operatively connected to the rotatable cam-shaped extension 222a through the transfer arm 274 having a rotation end attached to the engaging cam-shaped extension 270, at a proximal connection point 271, spaced apart from a rotation center 276b of the engaging cam-shaped extension 270, and a spindle end attached to the rotatable cam-shaped extension 222a, at a distal connection point 272, spaced apart from the rotation center 276a of the rotatable cam-shaped extension 222a. As can be seen, in the illustrated embodiment, the proximal connection point 271 and the distal connection point 272 are positioned at opposed angular position with respect to the engaging cam-shaped extension 270 and rotatable cam-shaped extension 222a respectively. One skilled in the art will understand that, in an alternative embodiment, the rotation end of the transfer arm 274 could be mounted directly to the connecting rotational gear 223, without the use of the engaging cam-shaped extension 270, the engaging cam-shaped extension 270 simply being an extension of the connecting rotational gear 223.

One skilled in the art would understand that, in an alternative embodiment, the rotatable cam-shaped extension 222a and the engaging cam-shaped extension 270 could present another shape than an irregular cam shape, such as, for example and without being limitative, an elongated shape, with an attachment point spaced apart from a corresponding rotation center, or an eccentric wheel.

In another alternative embodiment (not shown), the stationary member 20 could be a stationary extension with an attachment point spaced apart from a center section of the bottom bracket and the rotatable member 22 could be a rotatable extension. In such an embodiment, the stationary extension could be operatively connected to the rotatable extension by a transfer arm attached at a first end to an attachment point of the stationary extension spaced apart from a center section of the bottom bracket and at a second end at an attachment point of the rotatable extension spaced apart from a rotation center of the rotatable extension.

As mentioned above, alternative connecting assemblies which operatively connect the stationary member 20 and the rotatable member 22 such that the rotatable member 22 is engaged in rotation by the rotation of the crank arm 12 relative to the stationary member 20 could also be provided Referring to FIG. 1, in an embodiment, the crank arm assembly 21 comprises a cover 60 for aesthetical purposes. The cover 60 can be mounted over the stationary member 20, the rotatable member 22, and the connecting assembly 24. The cover may be maintained in place by traditional mounting means, such as, without being limitative, screws or the like. In an alternative embodiment, the stationary gear 20a, rotatable gear 22a and connecting assembly 24 can be contained in the housing of the crank arm 12.

In order to control the angle of the pedal 50 during the rotation of the crank arm 12 about the bottom bracket shell 14 and the stationary member 20, the rotatable member 22 is operatively connected to a pedal angular control assembly 40 which controls the angle of the pedal 50, during such rotation.

In the illustrated embodiment of FIGS. 2A to 2C, and 5A to 6, the pedal angular control assembly 40 includes two cams 44 operatively connected to the spindle 41 through a cam connecting assembly 45 and abutting with an abutting assembly operatively connected to the pedal 50, to control the angle of the pedal 50 upon rotation of the crank arm 12. The cam connecting assembly includes a "Y" shaped cam support plate 42 operatively connected to the spindle 41 which is rotatably mounted to the crank arm 12. As mentioned above, the spindle 41 is engaged in rotation by the rotatable gear 22a. The cam support plate 42 is mounted to the spindle 41 and thus rotates therewith upon rotation of the rotatable gear 22a. The cam connecting assembly 45 further includes two cam gears 46 mounted to the cam support plate 42. Each one of the cam gears 46 is rotatably mounted to the cam support plate 42, as will be described in more details below. The cams 44 are coupled to a respective one of the cam gears 46 through respective connecting rods 43. Thus, the cams 44 rotate simultaneously with the cam gears 46. The cam connecting assembly 45 further includes a fixed or stationary gear 48 meshing with the cam gears 46. Thus, the cam gears 46 rotates around the stationary gear 48 upon rotation of the spindle 41 and the cam support plate 42. The abutting assembly includes two bearings 49 acting as abutting cam members and mounted to the pedal 50, each one of the two bearings 49 being abutted by a respective one of the two cams 44.

One skilled in the art will understand that in an alternative embodiment, the number of cams 44 could be varied to include only one cam 44 or more than two cams 44 and the cam connecting assembly 45 and abutting assembly could be modified accordingly. Moreover, the size and shape of the support plate 42 could be varied from the "Y" shape of the illustrated embodiment while still offering an axis of rotation for the cams 44 that is spaced apart from the axis of rotation of the spindle 41.

Figure 5A:
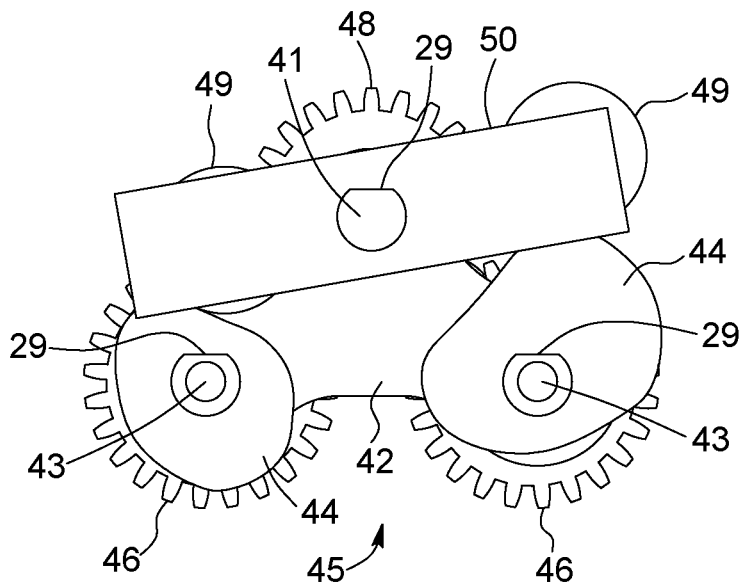
Figure 5B:
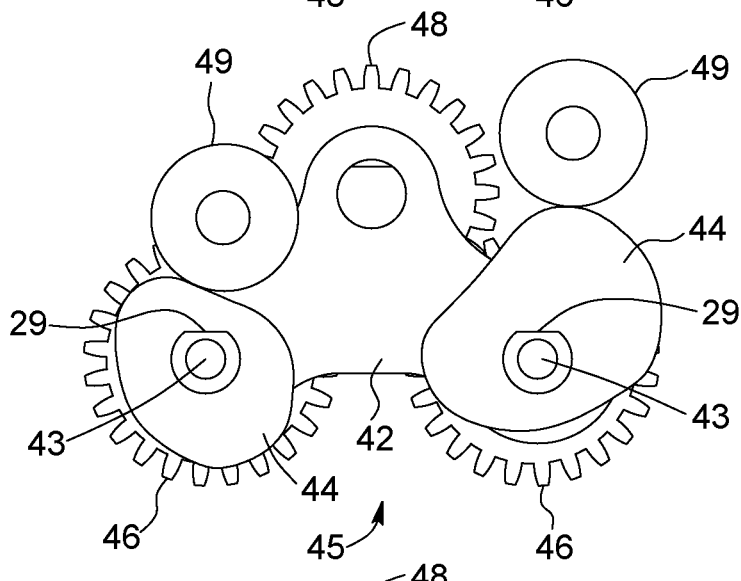
Figure 5C:
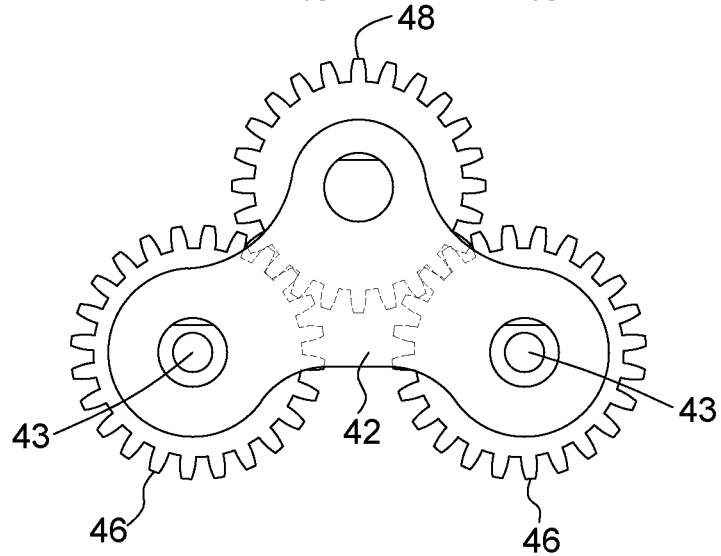

As can be seen in the illustrated embodiment of FIGS. 2A to 2C, in order to attach the rotatable gear 22a to the spindle 41, a section of the spindle 41 may present a substantially rounded configuration with a slot formed thereon and the rotatable gear 22a may present a complementary aperture for connecting thereto. Thus, the spindle 41 is securely mounted to and engaged in rotation by the rotatable gear 22a. Similarly, as can be seen in FIGS. 5A to 5C, to prevent rotation of the support plate 42 about the spindle 41 and to prevent the rotation of the cam gears 46 and the cams 44 about the connecting rods 43, a section of the spindle 41 and the connecting rods 43 may present a rounded configuration with a flat section 29, and the support plate 42, the cam rotatable gears 46 and the cams 44 may present complementary apertures for connecting thereto. One skilled in the art will however understand that other configurations resulting in the attachment of the components together, without rotation therebetween, could be provided. For example and without being limitative, the configuration of the section of the spindle 41 or the connecting rod 43, and the complementary aperture of the corresponding elements could be triangular, square or the like.

One skilled in the art will understand that in an alternative embodiment, other abutting assemblies could be mounted to the pedal 50 instead of the bearings 49. For example and without being limitative, in an embodiment, the bearing 49 could be replaced by a shaft or the pedal 50 could be sized and shaped to directly abut with the cams without the use of an abutting assembly.

As explained above, when a user causes the rotation of the crank arm 12 by making a pedaling movement, the interaction of the stationary gear 20a, the connecting assembly 24 and the rotatable gear 22a causes the rotation of the rotatable gear 22a. In the illustrated embodiment, such a rotation of the rotatable gear 22a causes the rotation of the spindle 41 onto which the rotatable gear 22a is mounted, which in turn drives the cam support plate 42 to rotate about a rotation axis defined by the spindle 41. In an embodiment, the cam support plate 42 is a plate made of rigid material such as, but not limited to, metal, which is connected to the spindle 41. As explained above, the spindle 41 may be shaped such that a cam support plate 42 having a complementary connecting aperture cannot freely rotate on the spindle 41 when mounted thereon, but is rather fixedly mounted thereto. For example and without being limitative, in the illustrated embodiment of FIGS. 5A to 5C, the spindle 41 has a rounded configuration with a flat section 29 and the complementary connecting aperture of the cam support plate 42 has a similar peripheral shape, thereby resulting in the cam support plate 42 rotating at the same speed as the spindle 41 connected to the rotatable gear 22a.

Referring to FIGS. 5A to 5C, in an embodiment, two cams 44 are mounted to the cam support plate 42. The cams 44 are each connected to a corresponding cam gear 46. In the illustrated embodiment, the cam gears 46 are mounted on one face of the cam support plate 42, while the cams 44 are mounted on the other face of the support plate 42. However, one skilled in the art will understand that, in an alternative embodiment, the cam rotatable gears 46 and the cams 44 may be mounted on the same face of the cam support plate 42. The cam gears 46 and the cams 44 are both rotatably mounted to the cam support plate 42 through bearing assemblies, but are coupled to one another by a connecting rod 43, such that they rotate simultaneously and at the same speed.

The rotation of each cam 44 is driven by the rotation of the corresponding cam gear 46 which are engaged in rotation by the combination of their meshing with the stationary gear 48 and the above-mentioned rotation of the cam support plate 42 about a rotation axis defined by the spindle 41. In other words, as the cam support plate 42 is engaged in rotation by the rotation of the spindle 41, the cam gears 46 are driven around the stationary gear 48 and therefore caused to rotate, thereby driving the cams 44 to rotate simultaneously. Hence, the combination of the support plate 42, the cam gears 46, and the stationary gear 48, form the above-mentioned cam connecting assembly 45 operatively connecting the spindle 41 and the cams 44, for engaging the cams 44 in rotation during rotation of the spindle 41.

In the illustrated embodiment, the cams 44 further cooperate with bearing assemblies 49 mounted to the pedal 50 to vary the angle of the pedal 50 during rotation of the crank arm 12, with the cams 44 abutting on the bearing assemblies 49. In the illustrated embodiment, the cams 44 and cooperating bearing assemblies 49 are located at the forward and backward ends of the pedal 50. However one skilled in the art will easily understand that, in an alternative embodiment, a different positioning of the cams 44 and corresponding bearing assemblies 49 could be provided. The shape of the cams 44 either drives the corresponding extremity of the pedal upward, downward, or maintains it even during a rotation. Once again, it should be understood that in alternative embodiments, other abutting assembly may be used to replace the bearings 49.

Figure 6:
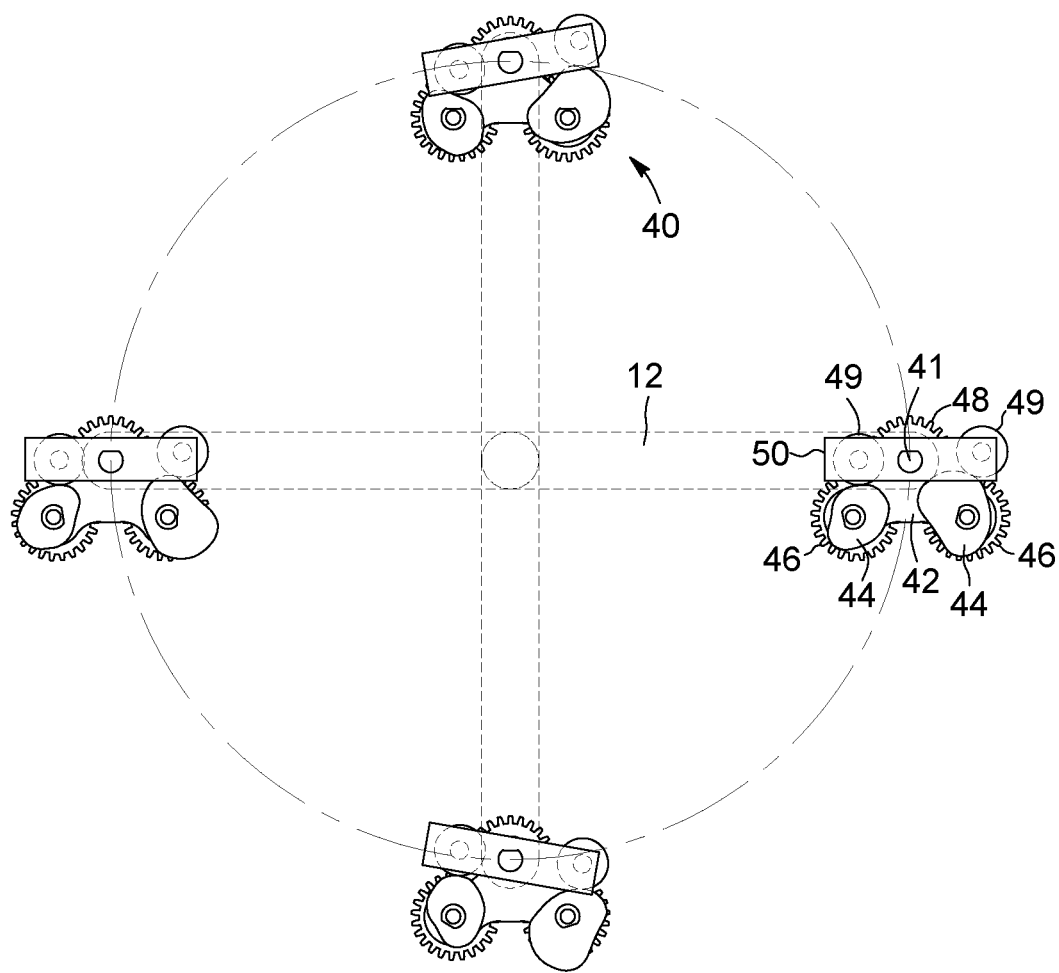
FIG. 6 is a schematic representation of an angular sequence of a pedal during a complete rotation of the crank arm assembly with the pedal angular control assembly shown in FIGS. 5A to 5C.

It will be understood that the cams 44 are shaped such that the pedal 50 follows a predetermined angular sequence during a complete rotation of the crank arm 12, the angular sequence being the same for every rotation. The predetermined angular sequence is based on the desired angle of the pedal 50 at the different position of the crank arm 12, in order to obtain an increased thrust force. An embodiment of a predetermined angular sequence during a complete rotation of the crank arm 12 is illustrated at FIG. 6, where the spindle 41 engages the pedal 50 along its center of gravity. It is appreciated that the shape of the cams can be varied to modify the angular sequence of the pedal 50.

As can be seen, in the embodiment of FIG. 6, each cam 44 performs a complete rotation during a complete rotation of the crank arm 12. Such a timing is performed by an adequate combination of the size and/or teeth ratio of the stationary gear 20a, the rotatable gear 22a, the cam gears 46a, the stationary gear 48 and the cams 44. One skilled in the art will understand that the size and/or teeth ratio of these components, or any other components according to alternative embodiments, could be varied in order to attain the desired rotation speed of the cams 44 to provide the desired angular sequence of the pedal.

Figure 7A:
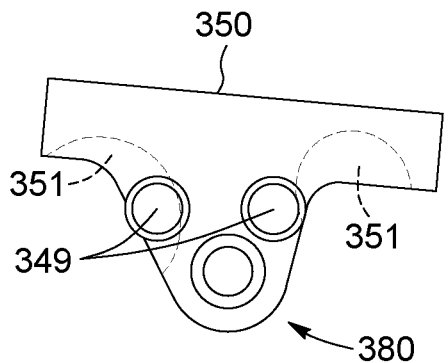
FIG. 7A is an inner side elevation view of a pedal according to an embodiment where the pedal angular control assembly includes cams and abutting cam members and a rotation axis of the spindle is spaced apart from a center of gravity of the pedal.
Figure 7B:
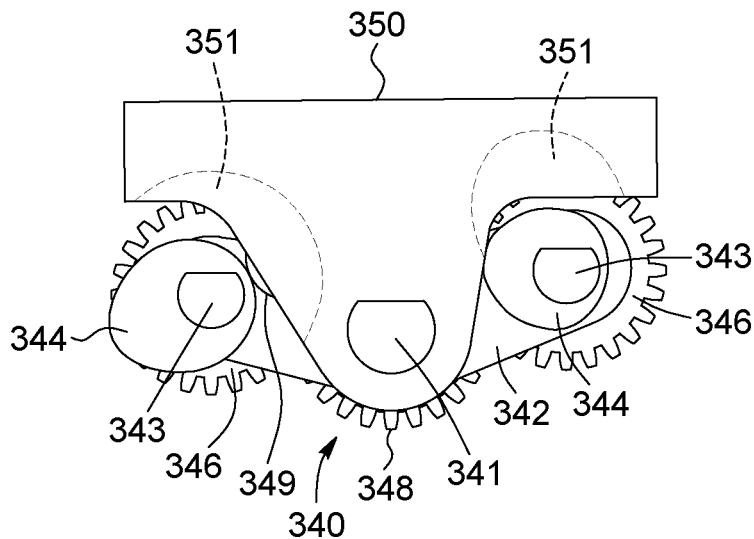
Figure 7C:
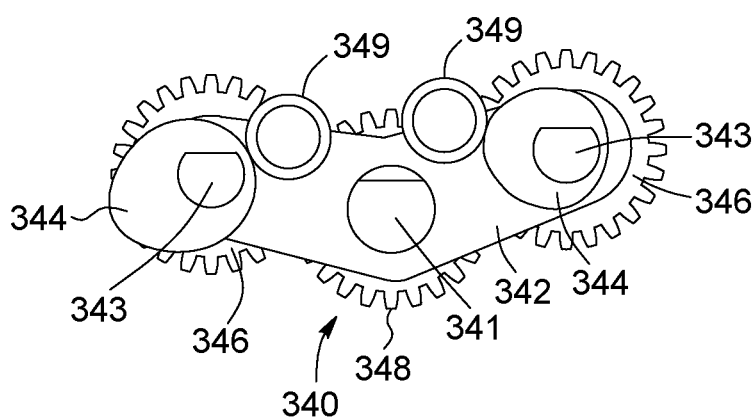
Figure 7D:
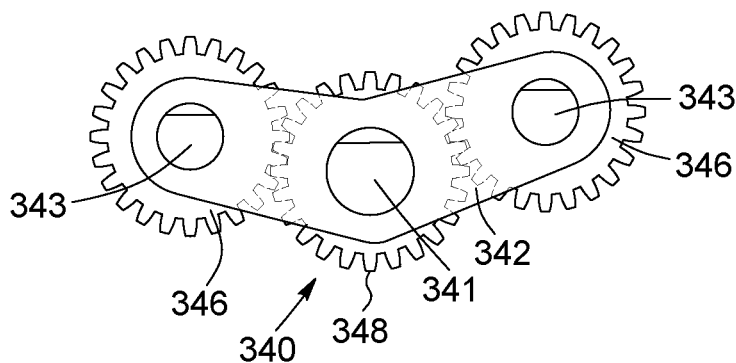
Figure 8:
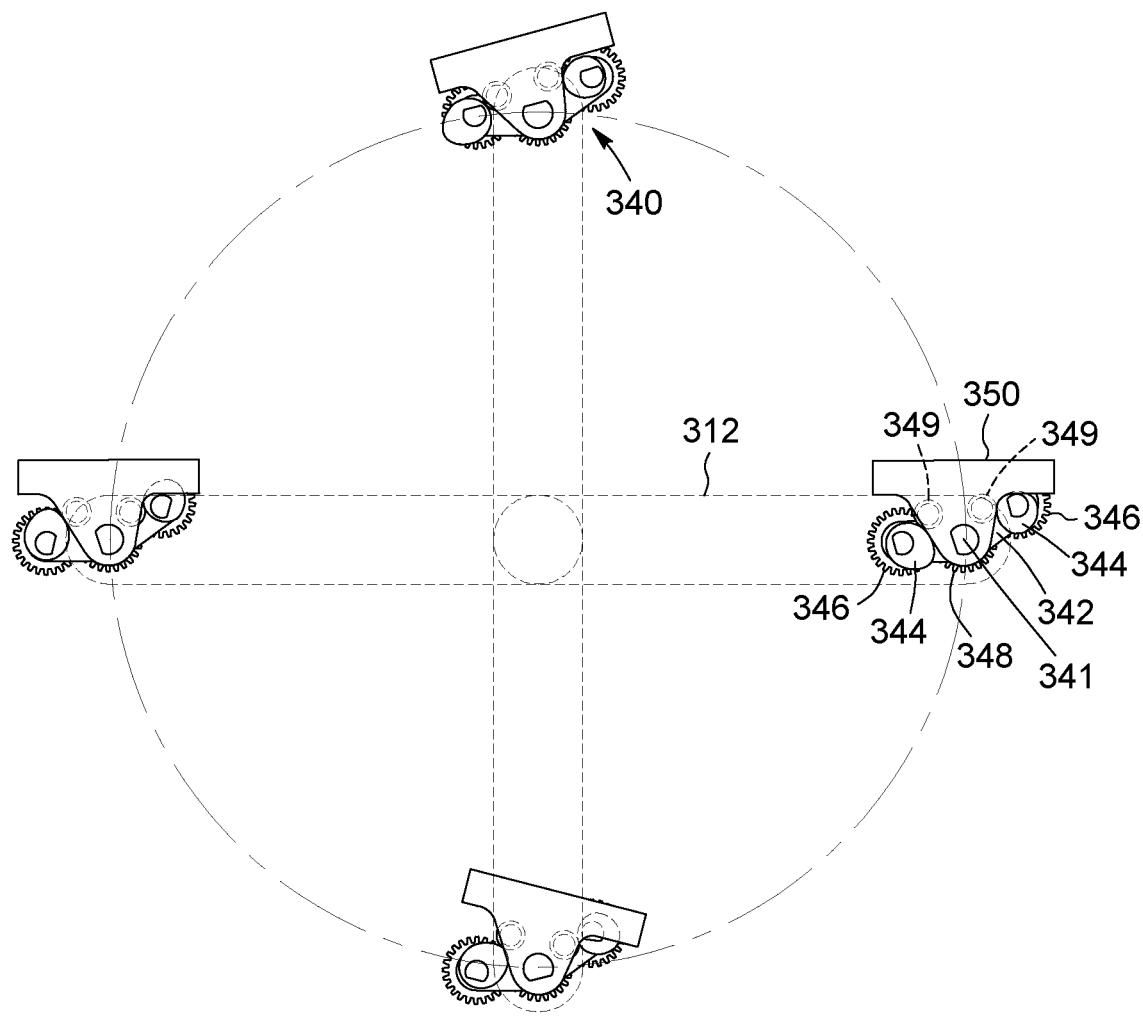
FIG. 8 is a schematic representation of an angular sequence of a pedal during a complete rotation of the crank arm assembly with the pedal angular control assembly shown in FIGS. 7A to 7D.

Now referring to FIGS. 7A to 8, in an embodiment where like features are numbered with corresponding reference numbers in the 300 series, the pedal 350 may be configured to be offset from the spindle 341, i.e. the pedal 350 is not configured such that the spindle 341 engages the pedal 350 along its center of gravity. As can be seen, in the illustrated embodiment, the pedal 350 receives the spindle 341 at a lower section 380 thereof, spaced apart from its center of gravity. In the illustrated embodiment of FIGS. 7A to 7D, the angular control assembly 340 is similar to the one described above. The angular control assembly 340 still includes the spindle 341, the support plate 342 operatively connected to the spindle 341, two cams 344 mounted to the support plate 342 and coupled to cam gears 346 by respective connecting rods 343, a stationary gear 348 meshing with the cam gears 346 and two bearings 349 mounted to the pedal 350 and abutting with the cams 344. However the components are disposed in a more compacted configuration where the two bearings 349 are disposed in a more central configuration and the shape of the support plate 342 is a "V" shape rather than a "Y" shape. As can be seen, the pedal 350 may be shaped with cam receiving sections 351 for receiving therein a corresponding one of the cams 344 when the pedal 350 is angled such that one of the cams 344 would hinder the pivoting of the pedal 350. The positioning of the spindle 341 spaced-apart from the center of gravity of the pedal 350 allows a greater pedaling power during the pedaling cycle.

Once again, the cams 344 are shaped such that the pedal 350 follows a predetermined angular sequence during a complete rotation of the crank arm 312, the angular sequence being the same for every rotation. The predetermined angular sequence is based on the desired angle of the pedal 350 at the different position of the crank arm 312, in order to obtain an increased thrust force. An embodiment of a predetermined angular sequence during a complete rotation of the crank arm 312 is illustrated at FIG. 8, where the spindle 341 engages the pedal 350 at a section spaced apart from its center of gravity.

One skilled in the art will easily understand that, in an alternative embodiment, different angular control assemblies 40 than the one described above could be provided for controlling the angle of the pedal.

Figure 9A:
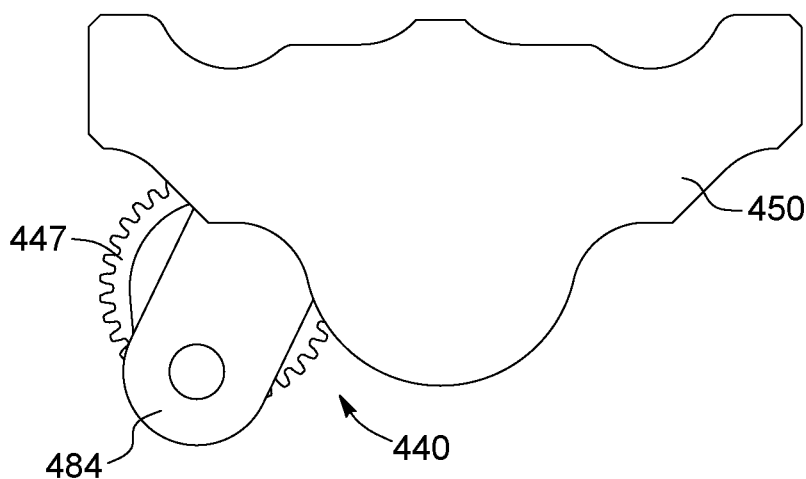
Figure 9B:
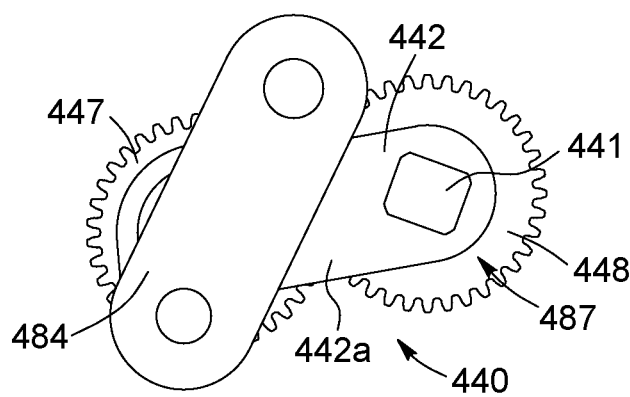
Figure 9C:
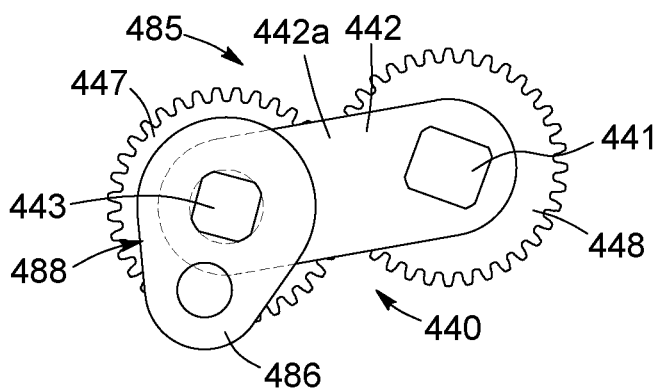

For example and without being limitative, referring to FIGS. 9A to 9C, in an embodiment where like features are numbered with corresponding reference numbers in the 400 series, the pedal angular control assembly 440 includes an angular control arm 484 operatively connected to the spindle 441 through an arm connecting assembly 485 at a first end and operatively connected to the pedal at a second end. The arm connecting assembly 485 includes a support plate 442 operatively connected to the spindle 441 which is rotatably mounted to the crank arm 412 and rotatably driven by the rotation of the rotatable gear (not shown) operatively mounted thereto, a stationary gear 448 fixedly mounted to the crank arm 412 at the spindle end 475 thereof, an eccentric connector gear 447 meshing with the stationary gear 448 and rotating therearound and an eccentric connector 486 coupled to the eccentric connector gear 447.

In the illustrated embodiment, the support plate 442 is embodied by a connecting arm 442a, given that a single eccentric connector gear 447, eccentric connector 486 and angular control arm 484 are provided. One skilled in the art would however understand that, in an alternative embodiment, the support plate 442 could have a different shape in order to provide more than one eccentric connector gear 447, eccentric connector 486 and angular control arm 484 in the pedal angular control assembly 440. For example and without being limitative, the support plate 442 may have the shape of the support plate of the above described embodiment.

Similarly to the above-described embodiment, in the present embodiment, the pedal angular control assembly 440 uses the rotation of the spindle 441 induced by the rotation of the rotatable gear (not shown), to drive the connecting arm 442a to rotate about a rotation axis defined by the spindle 441. As described above, the section of the spindle 441 connecting with the connecting arm 442a may be shaped such that the connecting arm 442a, having a complementary connecting aperture at a spindle end 487 cannot freely rotate on the spindle 441 when mounted thereon but, instead, the spindle 441 engages the connecting arm 442a in rotation. For example and without being limitative, in the illustrated embodiment of FIGS. 9A to 9C, the spindle 441 has a square configuration and the complementary connecting aperture of the spindle end 487 of the connecting arm 442a has a similar peripheral shape. The stationary gear 448 is fixedly mounted to the crank arm 412 such that the spindle 441 extends therethrough at a center section thereof and can rotate therein.

The eccentric connector gear 447 and the eccentric connector 486 are rotatably mounted to the connecting arm 442a at a gear end 488 thereof. The eccentric connector gear 447 and the eccentric connector 486 are coupled to one another such that rotation of the eccentric connector gear 447 causes the eccentric connector 486 to rotate simultaneously. In an embodiment, the eccentric connector gear 447 and the eccentric connector 486 are both rotatably mounted to the connecting arm 442a through bearing assemblies and are coupled to one another by a connecting rod 443, such that they rotate simultaneously and at the same speed.

The rotation of the eccentric connector 486 is driven by the rotation of the corresponding eccentric connector gear 447 which is engaged in rotation by the combination of its meshing with the stationary gear 448 and the above-mentioned rotation of the connecting arm 442a about a rotation axis defined by the spindle 441. In other words, as the connecting arm 442a is engaged in rotation by the rotation of the spindle 441, the eccentric connector gear 447 is driven around the stationary gear 448 and therefore rotates, thereby driving the eccentric connector 486 to rotate simultaneously.

In the illustrated embodiment, the eccentric connector 486 is connected to the angular control arm 484 to vary the angle of the pedal 450 during rotation of the crank arm 412. In the illustrated embodiment, the angular control arm 484 is connected at a first end to the eccentric connector 486 at an eccentric connection point, i.e. a connection point spaced-apart from a rotation center thereof, and at a second end to a backward end of the pedal 450. In an embodiment, pins are used to connect the angular control arm 484 to the eccentric connector 486 at the first end and to the pedal 450 at the second end. The movement of the angular control arm 484 driven by the rotation of the eccentric connector gear 447 during the rotation of the crank arm 412 causes the angle of the pedal 450 to be varied upon rotation of the crank arm 412.

One skilled in the art will easily understand that, in an alternative embodiment, a different positioning of the angular control arm 484 relative to the pedal 450 could be provided.

Figure 10:
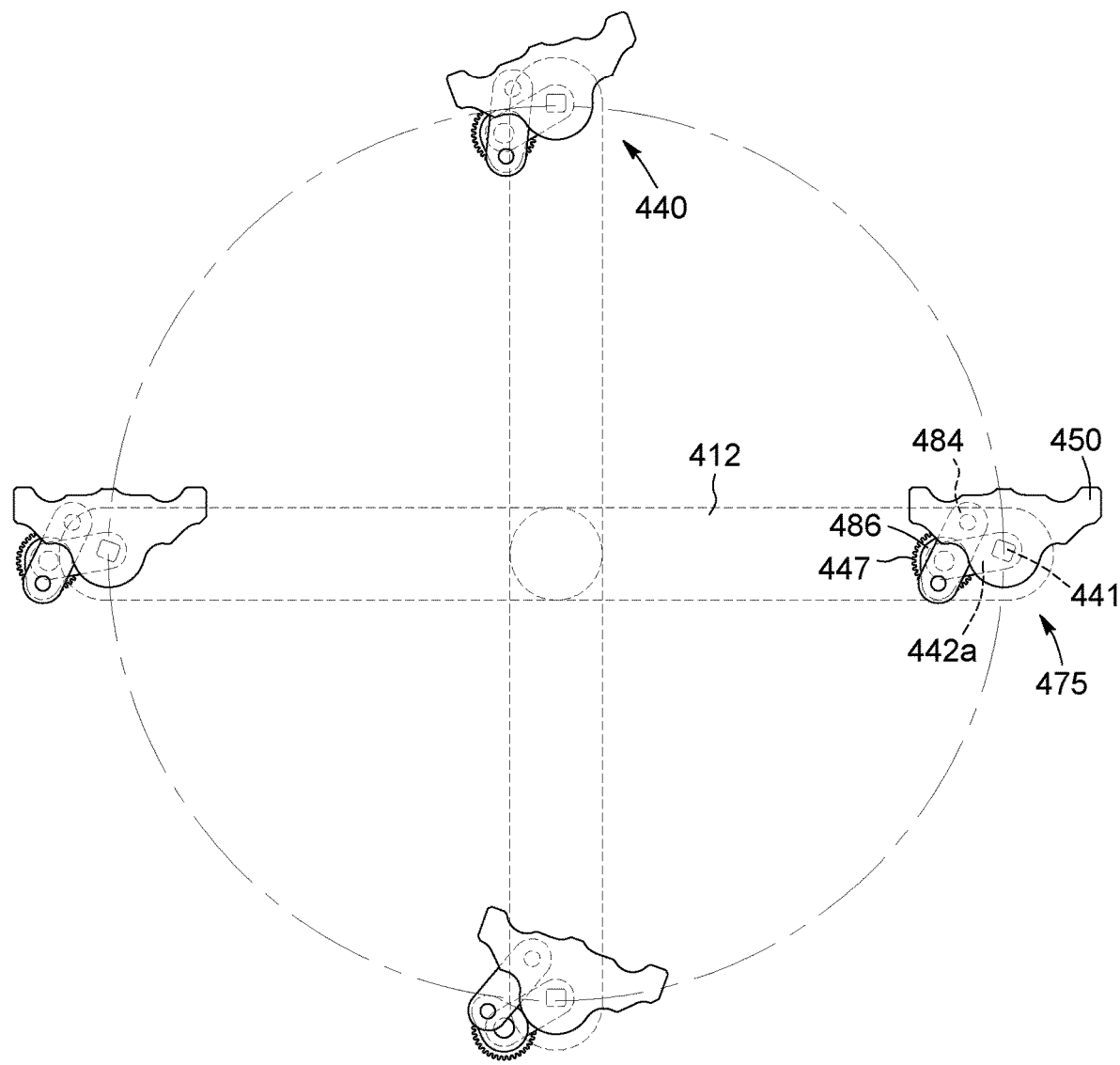
FIG. 10 is a schematic representation of an angular sequence of a pedal during a complete rotation of the crank arm assembly with the pedal angular control assembly shown in FIGS. 9A to 9C.

Once again, it will be understood that the angular control arm 484 and the arm connecting assembly 485 are configured such that the pedal 450 follows a predetermined angular sequence during a complete rotation of the crank arm 412, the angular sequence being the same for every rotation. The predetermined angular sequence is based on the desired angle of the pedal 450 at the different position of the crank arm 412, in order to obtain an increased thrust force. An embodiment of a predetermined angular sequence during a complete rotation of the crank arm 412, using the above-described pedal angular control assembly is illustrated at FIG. 10.

Figure 11A:
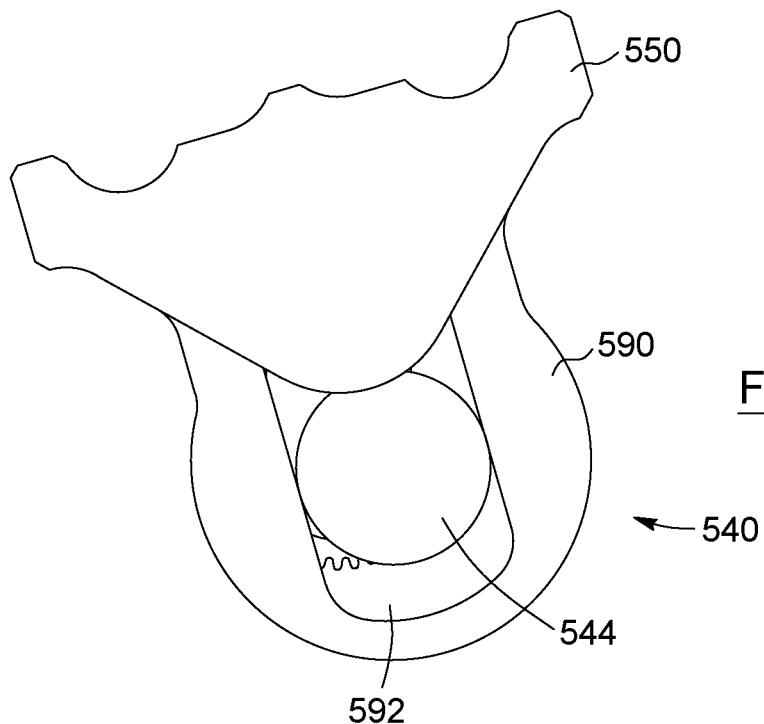
Figure 11B:
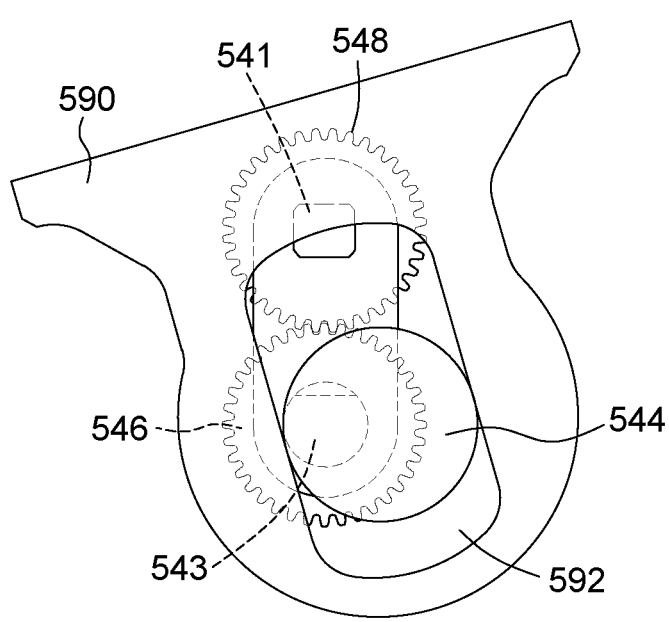
Figure 11C:
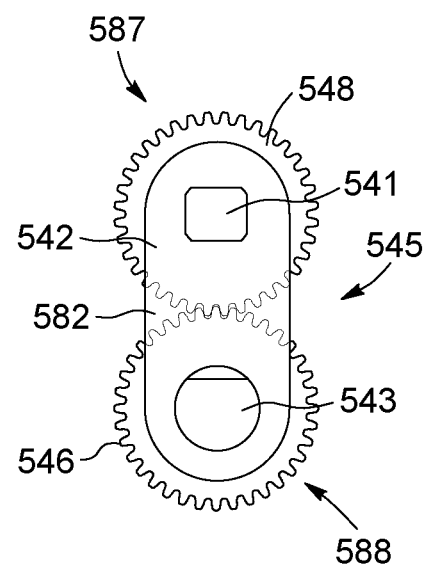

Now referring to FIGS. 11A to 11C, in another embodiment where like features are numbered with corresponding reference numbers in the 500 series, the pedal angular control assembly 540 includes a cam 544 operatively connected to the spindle 541 through a cam connecting assembly 545 and abutting with an abutting assembly operatively connected to the pedal 550, to controls the angle of the pedal 550 upon rotation of the crank arm 512. The cam connecting assembly 545 includes a support plate 542 hereby embodied by a connecting arm 582 operatively connected to the spindle 541 which is rotatably mounted to the crank arm 512 and rotatably driven by the rotation of the rotatable gear (not shown) operatively mounted thereto, a stationary gear 548 fixedly mounted to the crank arm 512 at the spindle end 575 thereof, and a cam gear 546 meshing with the stationary gear 548. The abutting assembly includes a cam receiving plate 590 mounted to the pedal and having at least one cam receiving cavity 592 defined therein.

Similarly to the above-described embodiment, in the present embodiment the pedal angular control assembly 540 uses the rotation of the spindle 541 induced by the rotation of the rotatable gear (not shown), to drive the connecting arm 582 to rotate about a rotation axis defined by the spindle 541. Similarly to the above described embodiment, the section of the spindle 541 connecting with the connecting arm 582 may be shaped such that the connecting arm 582, having a complementary connecting aperture at the spindle end 587 cannot freely rotate on the spindle 541 when mounted thereon but, instead, the spindle 541 engages the connecting arm 582 in rotation. The stationary gear 548 is once again fixedly mounted to the crank arm 512 such that the spindle 541 extends therethrough at a center section thereof and rotates therein.

The cam gear 546 and the cam 544 are rotatably mounted to the connecting arm 582 at a gear end 588 thereof. The cam gear 546 and the cam 544 are coupled to one another such that rotation of the cam gear 546 causes the cam 544 to rotate simultaneously. In an embodiment, the cam gear 546 and the cam 544 are both rotatably mounted to the connecting arm 582 through bearing assemblies and are coupled to one another by a connecting rod 543, such that they rotate simultaneously and at the same speed.

The rotation of the cam 544 is driven by the rotation of the cam gear 546 which is engaged in rotation by the combination of its meshing with the stationary gear 548 and the above-mentioned rotation of the connecting arm 582 about a rotation axis defined by the spindle 541. In other words, as the connecting arm 582 is engaged in rotation by the rotation of the spindle 541, the cam gear 546 is driven around the stationary gear 548 and therefore caused to rotate, thereby driving the cam 544 to rotate simultaneously.

In the illustrated embodiment, the cam 544 is received in a cam receiving cavity 592 of a cam receiving plate 590 mounted to the pedal 550 to vary the angle of the pedal 550 during rotation of the crank arm 512. In the illustrated embodiment, the cam receiving cavity 592 is substantially rectangular and the cam 544 is a circular member connected to the cam gear 546 at a connection point spaced-apart from a rotation center of the circular member. Therefore, the rotation of the cam gear 546 driving the cam 544 in rotation causes a displacement of the cam 544 within the cam receiving cavity 592 and results in the angle of the pedal 550 being varied upon rotation of the crank arm 512.

One skilled in the art will easily understand that, in an alternative embodiment, the size and shape of the cam 544 and the cam receiving cavity 592 could be varied from the embodiment shown. Moreover, it will be understood that, in an embodiment, the cam receiving plate 590 could be integral to the pedal 550.

Figure 12:
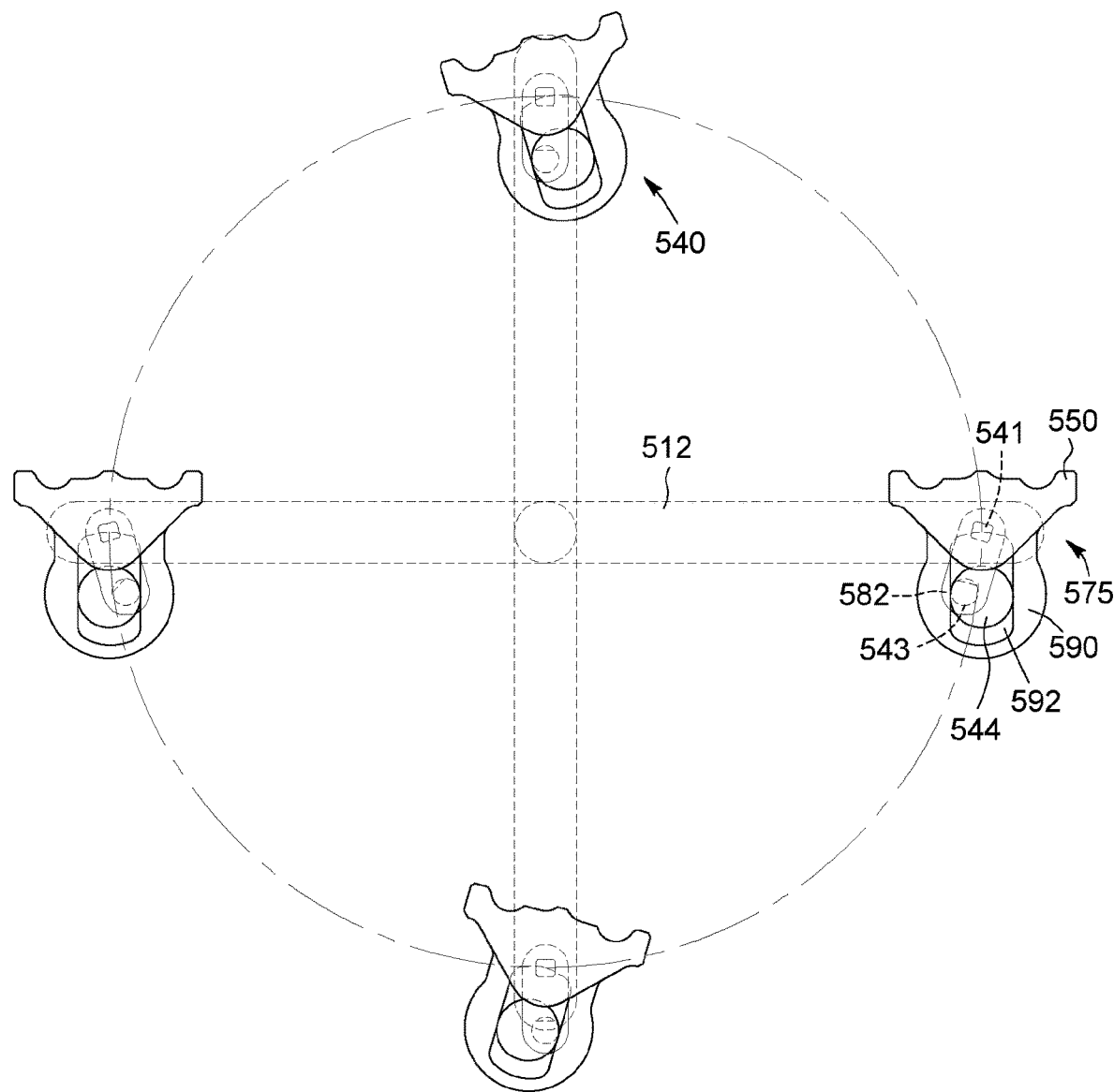
FIG. 12 is a schematic representation of an angular sequence of a pedal during a complete rotation of the crank arm assembly with the pedal angular control assembly shown in FIGS. 11A to 11C.

Once again, the cam 544 and the cam receiving plate 590 are configured such that the pedal 550 follows a predetermined angular sequence during a complete rotation of the crank arm 512, the angular sequence being the same for every rotation. The predetermined angular sequence is based on the desired angle of the pedal 550 at the different position of the crank arm 12, in order to obtain an increased thrust force. An embodiment of a predetermined angular sequence during a complete rotation of the crank arm 512, using the above-described pedal angular control assembly 540 is illustrated at FIG. 12.

In the above described embodiments, the cams have been exemplified as either eccentrically mounted wheels or cylinders having an irregular shape. It is appreciated that, in alternative embodiments, when referring to cams, both implementations of cams can be used.

Furthermore, in the above described embodiments, the spindle is rotatably mounted to the crank arm and is engaged in rotation by the rotatable member. In an alternative embodiment, the spindle may be operatively connected to the crank arm but not mounted directly thereon while still being engaged in rotation by the rotatable member.

Even though the present document refers to one crank arm 12 controlling the angle of one pedal 50 during the rotation of the crank arm 12 when describing the crankset 10, one skilled in the art will understand that since a crankset comprises two crank arms 12, each connected to a pedal 50, in an embodiment, a similar mechanism is provided on each crank arm 12 of the crank set for controlling the angle of each one of the pedals. In other words, the above described mechanism may be applied to each crank arm 12 of the crankset 10.

A crankset according to several alternative embodiments having been described above, a method for transferring power in a crankset of a pedal-driven vehicle will be described below. As mentioned above, the crankset includes a crank arm with a rotation end rotatably mounted to a bottom bracket shell of the pedal-driven vehicle, a spindle rotatably mounted to a spindle end of the crank arm, and a pedal operatively connected to the spindle hand having a foot receiving face. The method includes the first step of applying forces to the pedal in order to engage the crank arm in rotation about its rotation axis and a second step of controlling the angle of the foot receiving face of the pedal in accordance with an angular position of the crank arm during rotation thereof.

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

The invention claimed is:

1. A crankset for a pedal-driven vehicle having a frame with a bracket shell, the crankset comprising:
    a crank arm rotatably mounted to the bracket shell of the frame;
    a spindle operatively connected to the crank arm at an end spaced-apart from the bracket shell and rotatable about a spindle rotation axis;
    a pedal mounted to the spindle and having a foot receiving surface;
    a stationary member fixedly mounted to the bracket shell;
    a rotatable member operatively engaged with the spindle and configured to engage the spindle in rotation;
    a connecting assembly operatively engaged with the stationary member and the rotatable member, the connecting assembly being configured to engage the rotatable member in rotation upon rotation of the crank arm about the bracket shell; and
    a pedal angular control assembly operatively connected to the spindle and varying an angle of the foot receiving surface of the pedal according to a predetermined angular sequence, during a complete rotation of the crank arm, the pedal angular control assembly comprising at least one cam operatively connected to the rotatable member and operatively engaged with the pedal and a cam connecting assembly configured to engage in rotation the at least one cam upon rotation of the rotatable member.

2. The crankset of claim 1, wherein the spindle is rotatably mounted to the crank arm at the end spaced-apart from the bracket shell.

3. The crankset of claim 1, wherein the stationary member comprises a stationary gear concentric with the bracket shell.

4. The crankset of claim 3, wherein the rotatable member comprises a rotatable gear and the connecting assembly comprises a plurality of intermediate rotatable gears extending between the stationary gear and the rotatable gear and each one being operatively connected with an adjacent one of the rotatable gear, stationary gear and intermediate gears.

5. The crankset of claim 3, wherein the rotatable member comprises a rotatable pulley and the connecting assembly comprises:
    a connecting rotatable gear meshing with the stationary gear and configured to rotate about the stationary gear;
    an engaging pulley mounted to the connecting rotatable gear and rotating simultaneously therewith; and
    a belt operatively connecting the engaging pulley and the rotatable pulley.

6. The crankset of claim 3, wherein the connecting assembly comprises:
    a connecting rotatable gear meshing with the stationary gear and configured to rotate about the stationary gear; and
    a transfer arm having a rotation end operatively connected to the connecting rotatable gear at a proximal connection point spaced-apart from a rotation center thereof and a spindle end, opposed to the rotation end, operatively connected to the rotatable member at a distal connection point spaced-apart from a rotation center thereof.

7. The crankset of claim 1, wherein the pedal angular control assembly further comprises an abutting assembly operatively connected to the pedal and abutting the at least one cam to vary the angle of the foot receiving surface of the pedal according to the angular position of the crank arm during rotation thereof and the abutting assembly comprises at least one abutting cam member rotatably mounted to the pedal, each one of the at least one abutting cam member abutting with a corresponding one of the at least one cam.

8. The crankset of claim 7, wherein the cam connecting assembly comprises:
    a cam connecting stationary gear; and
    at least one cam gear operatively engaged with the cam connecting stationary gear and configured to rotate about the cam connecting stationary gear, each one of the at least one cam being coupled to a respective one of the at least one cam gear;
    wherein the abutting assembly comprises a cam receiving plate mounted to the pedal and having at least one cam receiving cavity defined therein, the at least one cam being movable inside the at least one cam receiving cavity to vary the angle of the pedal according to the angular position of the crank arm during rotation thereof.

9. The crankset of claim 1, wherein the cam connecting assembly comprises:
    a cam connecting stationary gear;
    a cam support plate operatively connected to the spindle and configured to rotate the spindle; and
    at least one cam gear rotatably mounted to the cam support plate and configured to rotate about the cam connecting stationary gear upon rotation of the cam support plate, each one of the at least one cam being coupled to a respective one of the at least one cam gear.

10. The crankset of claim 1, wherein the pedal is configured to receive the spindle in a lower section thereof, spaced apart from a center of gravity of the pedal.

11. A crankset for a pedal-driven vehicle having a frame, the crankset comprising two crank arm assemblies, each one of the crank arm assemblies comprising:
    a crank arm rotatably mounted to the frame and having a rotation center at a rotation end thereof;
    a spindle operatively connected to the crank arm at a spindle end spaced-apart from the rotation end and rotatable about a spindle rotation axis;
    a pedal mounted to the spindle and having a foot receiving surface;
    a rotatable member operatively engaged with the spindle;
    a stationary member secured to the frame and close to the rotation end of the crank arm;
    a connecting assembly operatively engaged with the stationary member and the rotatable member and configured to engage the rotatable member in rotation upon rotation of the crank arm about the rotation center thereof; and
    a pedal angular control assembly operatively connected to the rotatable member, the pedal angular control assembly varying an angle of the foot receiving surface of the pedal according to a predetermined angular sequence, during a complete rotation of the crank arm about the rotation center and comprising at least one cam operatively connected to the rotatable member and operatively engaged with the pedal, and a cam connecting assembly configured to engage in rotation the at least one cam upon rotation of the spindle.

12. The crankset of claim 11, wherein the spindle is rotatably mounted to the crank arm at the end spaced-apart from the rotation end.

13. The crankset of claim 11, wherein the stationary member comprises a stationary gear concentric with the rotation center of the crank arm.

14. The crankset of claim 13, wherein the rotatable member comprises a rotatable gear and the connecting assembly comprises a plurality of intermediate rotatable gears extending between the stationary gear and the rotatable gear; and each one being operatively connected with an adjacent one of the rotatable gear, stationary gear and intermediate gears and each one of the stationary gear, the rotatable gear and the intermediate gears comprise a same number of teeth.

15. The crankset of claim 13, wherein the rotatable member comprises a rotatable pulley and the connecting assembly comprises:
    a connecting rotatable gear meshing with the stationary gear and configured to rotate about the stationary gear;
    an engaging pulley mounted to the connecting rotatable gear and rotating simultaneously therewith; and
    a belt operatively connecting the engaging pulley and the rotatable pulley.

16. The crankset of claim 13, wherein the connecting assembly comprises:
    a connecting rotatable gear meshing with the stationary gear and configured to rotate about the stationary gear; and
    a transfer arm having a rotation end operatively connected to the connecting rotatable gear at a proximal connection point spaced-apart from a rotation center thereof and a spindle end, opposed to the rotation end, operatively connected to the rotatable member at a distal connection point spaced-apart from a rotation center thereof, the proximal connection point and the distal connection point are positioned at opposed angular positions with respect to the connecting rotatable gear and the rotatable member respectively.

17. The crankset of claim 11, wherein the cam connecting assembly comprises:
    a cam connecting stationary gear;
    a cam support plate operatively connected to the spindle and configured to rotate therewith; and
    at least one cam gear mounted to the cam support plate and configured to rotate about the cam connecting stationary gear upon rotation of the cam support plate, each one of the at least one cam being mounted to a respective one of the at least one cam gear.

18. The crankset of claim 11, wherein the pedal angular control assembly further comprises an abutting assembly operatively connected to the pedal and abutting the at least one cam to vary the angle of the foot receiving surface of the pedal according to the angular position of the crank arm during rotation thereof; and the cam connecting assembly comprises:
    a cam connecting stationary gear; and
    at least one cam gear operatively engaged with the cam connecting stationary gear and configured to rotate about the cam connecting stationary gear, each one of the at least one cam being coupled to a respective one of the at least one cam gear;
    wherein the abutting assembly comprises a cam receiving plate mounted to the pedal and having at least one cam receiving cavity defined therein, the at least one cam being movable inside the at least one cam receiving cavity to vary the angle of the foot receiving surface of the pedal according to the angular position of the crank arm during rotation of the crank arm.

19. A method for transferring power in a crankset of a pedal-driven vehicle, the crankset comprising a crank arm having a rotation end rotatably mounted to a bracket shell of the pedal-driven vehicle, a spindle operatively connected to a spindle end of the crank arm, and a pedal operatively connected to the spindle and having a foot receiving face, the method comprising:
    applying forces to the pedal to engage in rotation the crank arm about a rotation axis of the crank arm;
    driving at least one cam of a pedal angular control assembly in rotation by rotation of the crank arm about the rotation axis; and
    controlling an angle of the foot receiving face of the pedal according to a predetermined angular sequence, during a complete rotation of the crank arm, the controlling of the angle of the foot receiving face of the pedal being performed by the cam of the pedal angular control assembly.

* * * * *